(12) United States Patent  
Denissen

(10) Patent No.: US 8,813,068 B2  
(45) Date of Patent: Aug. 19, 2014

(54) SOFTWARE REPLACEMENT METHOD AND RELATED SOFTWARE REPLACEMENT SYSTEM

(75) Inventor: Frank Lodewijk Denissen, Boom (BE)

(73) Assignee: Alcatel Lucent, Boulogne-Billancourt (FR)

( * ) Notice: Subject to any disclaimer, the term of this patent is extended or adjusted under 35 U.S.C. 154(b) by 2459 days.

(21) Appl. No.: 10/892,273

(22) Filed: Jul. 16, 2004

(65) Prior Publication Data

US 2005/0022179 A1 Jan. 27, 2005

(30) Foreign Application Priority Data

Jul. 21, 2003 (EP) .................................... 03291803

(51) Int. Cl.
*G06F 9/445* (2006.01)

(52) U.S. Cl.
USPC ........... 717/177; 717/168; 717/170; 717/172; 717/175

(58) Field of Classification Search
None
See application file for complete search history.

(56) References Cited

U.S. PATENT DOCUMENTS

| | | | | |
|---|---|---|---|---|
| 5,390,256 A | * | 2/1995 | Mandell et al. ................. | 381/77 |
| 5,421,017 A | * | 5/1995 | Scholz et al. .................. | 717/170 |
| 5,682,533 A | | 10/1997 | Siljestoemer | |
| 5,764,992 A | * | 6/1998 | Kullick et al. ................. | 717/170 |
| 6,473,899 B1 | * | 10/2002 | Nelson et al. .................. | 717/173 |
| 6,684,396 B1 | * | 1/2004 | Brittain et al. ................. | 717/168 |
| 6,698,017 B1 | * | 2/2004 | Adamovits et al. ........... | 717/168 |
| 6,738,826 B1 | * | 5/2004 | Moberg et al. ................ | 709/242 |
| 6,915,513 B2 | * | 7/2005 | Duesterwald et al. ........ | 717/168 |
| 7,082,498 B2 | * | 7/2006 | Chatterjee et al. ............ | 711/114 |
| 7,107,329 B1 | * | 9/2006 | Schroder et al. .............. | 709/221 |
| 7,784,044 B2 | * | 8/2010 | Buban et al. .................. | 717/168 |
| 2002/0073410 A1 | | 6/2002 | Lundback et al. | |
| 2003/0048746 A1 | * | 3/2003 | Guess et al. ................... | 370/219 |
| 2003/0135660 A1 | * | 7/2003 | Mortazavi ..................... | 709/315 |
| 2003/0154264 A1 | * | 8/2003 | Martin et al. ................. | 709/221 |
| 2003/0176165 A1 | * | 9/2003 | Gosewehr ......................... | 455/9 |
| 2004/0088483 A1 | * | 5/2004 | Chatterjee et al. ............ | 711/114 |

FOREIGN PATENT DOCUMENTS

WO   WO 01/84792 A1   11/2001
WO   WO 02/48877 A1    6/2002

* cited by examiner

*Primary Examiner* — Isaac Tecklu
(74) *Attorney, Agent, or Firm* — Wolff & Samson, PC

(57) ABSTRACT

The present invention relates to a Software replacement method, for replacing a first software package that comprises a command handling interface which is present at a computer system, by a second software package over a connection between an operator terminal and this command handling interface. At first the second software package is installed besides the first software package at the computer system. Subsequently, the second software package is activated. Then a contacting part of the second software package, after activation of this second software package, contacts the command handling interface. The command handling interface at contacting of the command handling Interface by the contacting part of the second software package, switches from the first software package towards the second software package and keeps open the connection between the operator terminal and the command handling interface.

4 Claims, 1 Drawing Sheet

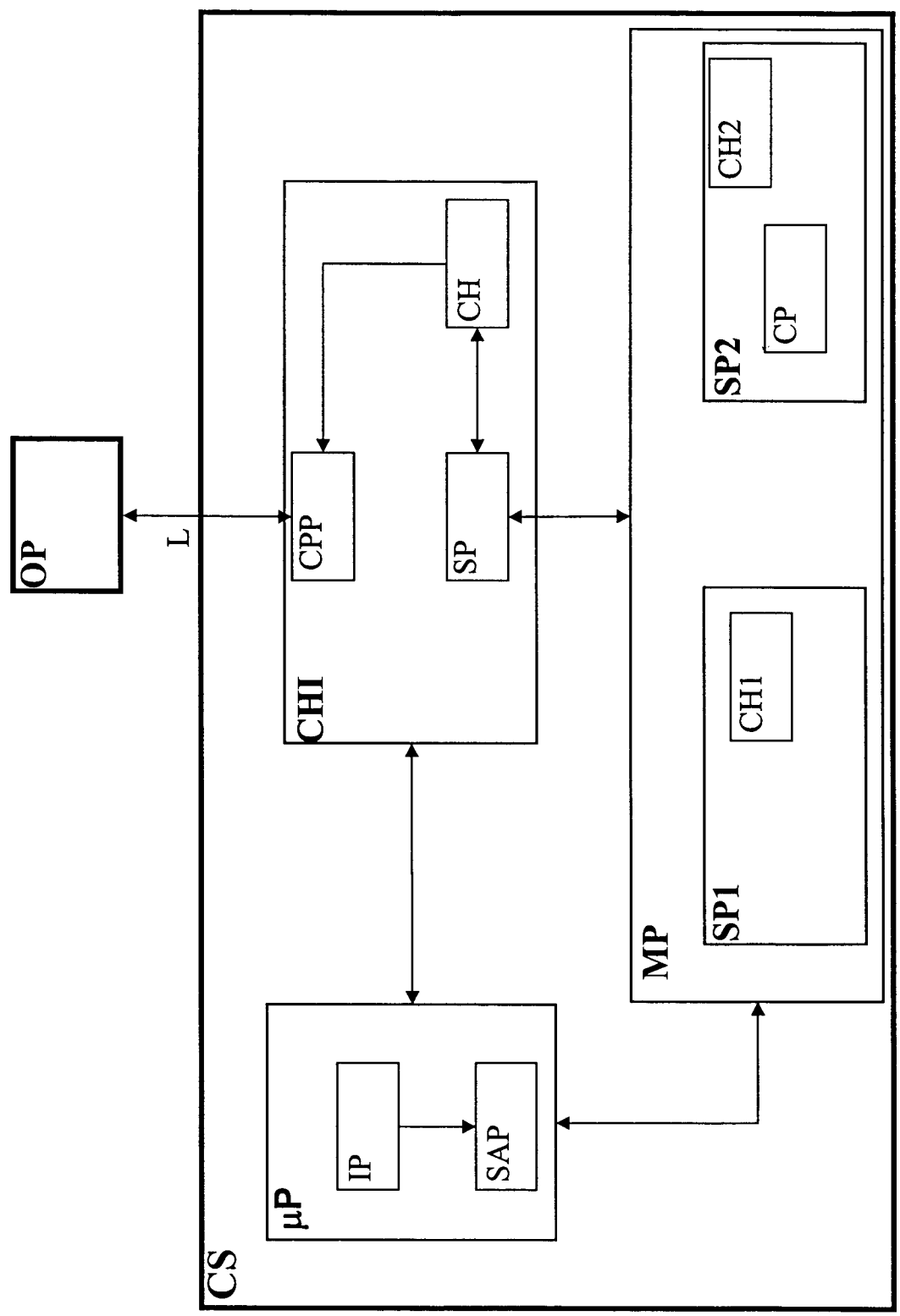

SOFTWARE REPLACEMENT METHOD AND RELATED SOFTWARE REPLACEMENT SYSTEM

The present invention relates to a software replacement method as described in the preamble of claim 1 and the related software replacement system as described in the preamble of claim 2.

Such a method and related system are already known in the art, e.g. from U.S. patent application with reference WO0248877 with title "REPLACING SOFTWARE AT A TELECOMMUNICATIONS PLATFORM" from the inventor A. Lundback et. al., published in Jun. 13, 2002.

Therein, the installation of a new software package replacing an old software package on a certain network element, called a telecommunications platform, e.g. a router, is disclosed. This replacement is done by first establishing a connection between an operator terminal and the command line interface of the network element. Subsequently a new software package replacing an old software package is installed via this established connection. At activation of the new software package, the connection to the network element is lost as the command handling interface forms part of the old, replaced software package which is deactivated. At activation of the new software package, a new command-handling interface forming part of the new package is activated at the same time. The operator may establish a new connection between the operator terminal and the new command-handling interface.

Since the command handling interface forms part of the old, software package the command line interface is stopped at deactivating the old software package.

An operator involved in this software package update is interested in keeping track of the progress of the software package update. However, this is not possible as no connection between the operator terminal and the network element is possible until the new software package including a new command-handling interface has started.

Moreover there is a chance that it is not possible anymore to establish the connection because the new software is not of the required quality. Hence, the operator has no view on the status and progress of the activation of the software: he has to poll to know when he can reestablish the connection. No messages from the network element can be send to the operator while the new software is being activated.

An object of the present invention is to provide with a software replacement method of the above known type and a related system but wherein the operator is able to keep track of the software replacement process.

According to the invention, this object is achieved by the Software replacement method as described in claim 1 and the Software replacement system as described in claim 2.

Indeed, by contacting the command handling interface currently maintaining an open connection, by the second software package after activation of the second software package, the command handling interface is notified of the presence of a replacing, second software package, which is activated and thus is able to support the command handling interface and whereupon the command handling interface will switch, without being deactivated, from the first software package towards the second software package for supporting this command handling interface, and at the same time a persisting means is activated that is able to keep open the existing connection during the switching from the first software package to the second software package.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

FIG. 1 represents a network element CS in a telecommunications system wherein the implementation of the present invention is realised.

In the following paragraphs, referring to the drawings, an implementation of software replacement method and the related system according to the present invention will be described. In the first paragraph of this description the main elements of the telecommunications system as presented in FIG. 1 are described. In the second paragraph, all connections between the before mentioned elements are defined. Subsequently, all relevant functional means of the network element CS are described followed by a description of all interconnections. In the succeeding paragraph the actual execution of the software replacement method is described.

In view of the present invention, the important elements of the telecommunications network wherein the network implementation is implemented are the network element CS and the operator position OP. For explaining the execution of the present invention only the described elements, a network element CS and the operator position OP are needed, although a common communications network usually consist of a large number of network elements and possible operator positions. The network element CS is responsible for routing calls through the network and the actual establishment of a connection. The operator position OP is responsible for provisioning the network elements with software update packages. The operator position OP is coupled to the network element CS over a network link L.

The network element CS contains a memory part MP that is able to store data and software. The memory part MP may for instance be a hard-disk. The network element CS contains a microprocessor µP being built up of an installation part IP that is able to install software package SP1, SP2 in the memory part MP of the network element CS and a software activation part SAP that is able to activate a software package SP1, SP2 which is installed in the memory part MP.

The network element CS further contains a command handling interface CHI that connects the network element CS to the operator position OP for purpose of exchange of amongst others software installation at the network element CS. The command handling interface CHI contains a communication persisting part CPP, a command handler CH and a switching part SP, that is able to switch the command handler CH from CH1 from the first, older, software package SP1 towards CH2 from the second, newer, software package SP2 for supporting the command handling interface CHI.

The second, and newer, software package contains a contacting part CP for contacting a command handling interface CHI after activation of the second software package SP2.

The microprocessor μP and the command handling interface CHI are coupled. Then, there is a coupling between the microprocessor μP and the memory part MP. Finally, there is a coupling between the command handling interface CHI and the memory part MP. The communication persisting part CPP from command handling interface CHI acts an input/output for the network element CS.

In order to explain the present invention it is assumed that there is a first software package SP1 installed and already active in the memory part MP of the network element CS. The Command handling interface CHI that is active currently is supported by the software of this first software package. The software package is being executed by the microprocessor μP. The command handling interface CHI maintains a connection between the network element CS and the operator position OP that is able to provide each network element of the entire communications network with new software packages if required.

It is further assumed that at a certain moment of time a, for some reason, an update of the software being active at the network element is required. A new, second software package SP2 is to be installed at the network element CS.

At first the operator position OP forwards the second software package SP2 over link L towards the network element CS. The installation part IP subsequently receives the software package SP2 and installs the second software package SP2 besides the first software package SP1, which is already present in the memory part MP of the network element CS. Subsequently, the software activation part SAP deactivates the first software package SP1, but without the CHI, and activates the second software package SP2. After activation of the second software package SP2, the contacting part CP of the second software package SP2 contacts the switching part SP of the command handling interface CHI.

Then the switching part SP switches the command handler CH that is CH1 from the first software package SP1 to CH2 of the second software package SP2 for supporting the command handling interface CHI without breaking the connection at contacting the command handling interface CHI by the second software package SP2.

The connection persisting part CPP then at the same time keeps open the existing connection after contacting the command handling interface CHI by the contacting part CP.

It is to be noted that the present invention is not restricted to a communications network as above described in the embodiment, but that the present invention is applicable in any computer system communicating with a software package provisioning element where a software replacement is executed.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A software replacement method, said method comprising:
installing a second software package to replace a first software package comprising a command handling interface, at a computer system;
activating said second software package;
contacting said command handling interface by a contacting part of said second software package after activation of said second software package;
when said command handling interface is contacted by said contacting part of said second software package, said command handling interface switching from said first software package towards said second software package; and
keeping a connection between an operator terminal and said command handling interface open after said contacting part contacts said command handling interface,
wherein the first software package is replaced with the second software package via a connection between the operator terminal and said command handling interface, said replacement occurs at a same time as said connection, and said connection is maintained before and after said replacement.

2. A software replacement system, said system comprising:
a memory;
an installation part adapted to install a second software package besides a first software package at a computer system;
a software activation part, adapted to activate said second software package;
a contacting part, adapted to contact a command handling interface after activation of said second software package;
a switching part, adapted to switch said command handling interface from said first software package to said second software package, when said command handling interface is contacted by said second software package; and
a connection persisting part, adapted to keep said connection between an operator terminal and said command handling interface open after contacting said command handling interface is contacted by said contacting part,
wherein the first software package is replaced with the second software package via a connection between the operator terminal and said command handling interface, said replacement occurs at a same time as said connection, and said connection is maintained before and after said replacement.

3. The software replacement method according to claim 1, wherein the first software package and the second software package are not simultaneously active at the computer system.

4. The software replacement system according to claim 2, wherein the first software package and the second software package are not simultaneously active at the computer system.

* * * * *